United States Patent [19]
Goder et al.

[11] Patent Number: 5,617,015
[45] Date of Patent: Apr. 1, 1997

[54] MULTIPLE OUTPUT REGULATOR WITH TIME SEQUENCING

[75] Inventors: Dimitry Goder, Sunnyvale; Hendrik Santo, Milpitas, both of Calif.

[73] Assignee: Linear Technology Corporation, Milpitas, Calif.

[21] Appl. No.: 477,455

[22] Filed: Jun. 7, 1995

[51] Int. Cl.⁶ .................................................... G05F 1/56
[52] U.S. Cl. ............................................. 323/282; 323/285
[58] Field of Search ................................. 323/222, 223, 323/225, 282, 284, 285, 267, 269, 271, 272

[56] References Cited

U.S. PATENT DOCUMENTS

| | | | |
|---|---|---|---|
| 5,119,013 | 6/1992 | Sabroff | 323/282 |
| 5,225,767 | 6/1993 | Gulczynski | 323/222 |
| 5,377,090 | 12/1994 | Steigerwald | 363/20 |
| 5,400,239 | 3/1995 | Caine | 363/67 |
| 5,467,009 | 11/1995 | McGlinchey | 323/269 |

*Primary Examiner*—Matthew V. Nguyen
*Attorney, Agent, or Firm*—Fish & Neave; Mark D. Rowland; Gabrielle E. Higgins

[57] ABSTRACT

A switching voltage regulator is described which provides multiple independently regulated outputs. A switch control independently monitors two or more voltage outputs and generates control signals for driving a main switch and two or more auxiliary switches to charge selective ones of the outputs which have fallen below their target voltages. Time sequencing techniques are utilized to control the switching of the auxiliary switches such that energy stored in an inductor is transferred to the appropriate voltage outputs. The switching voltage regulator may be implemented as an integrated circuit and may have various topologies, such as boost, buck, flyback or SEPIC.

21 Claims, 6 Drawing Sheets

MULTIPLE OUTPUT REGULATOR WITH TIME SEQUENCING

BACKGROUND OF THE INVENTION

This invention relates to a switching voltage regulator circuit. More particularly, the present invention relates to a switching voltage regulator circuit that can provide multiple independently regulated voltage outputs using time sequencing techniques.

There are increasing demands in the electronics industry for power supplies that provide multiple regulated outputs. In the past, most integrated circuits operated at 5 volts. Now, the standard operating voltage for an integrated circuit is 3.3 volts. In the future, newer integrated circuits are expected to operate at 2.5 volts and below. With various integrated circuits and electronic devices operating at different voltages, the ability to supply efficiently regulated multiple voltage outputs from a single power supply has become increasingly more important.

One approach to obtaining multiple regulated voltages from a conventional power supply has been to construct several independent regulators, each controlling its corresponding output. Another approach has been to connect to the outputs of a first stage regulator separate "post-regulators" (usually linear regulators) for each different voltage output desired. However, both of these approaches require additional components, which add cost and consume power and space, and thereby lower the efficiency of the power supply. A further approach has been to use a multiple winding technique or charge pump circuit to generate additional voltage outputs from a single regulated output. Here, the disadvantage is that the auxiliary outputs are not directly regulated. As a result, the auxiliary outputs may fluctuate depending on load and line variations.

In view of the foregoing, it would be desirable to provide a switching voltage regulator circuit having multiple independently regulated outputs, which is capable of efficient operation.

It would also be desirable to provide a switching voltage regulator circuit having multiple independently regulated outputs, which operates over a broad range of input voltages and output requirements.

SUMMARY OF THE INVENTION

It is therefore an object of the present invention to provide a switching voltage regulator circuit having multiple independently regulated outputs, which is capable of efficient operation.

It is also an object of the present invention to provide a switching voltage regulator circuit having multiple independently regulated outputs which operates over a broad range of input voltages and output requirements.

In accordance with these and other objects of the present invention, a switching voltage regulator having multiple independently regulated outputs is described. The switching voltage regulator utilizes time sequencing techniques to independently regulate the voltage outputs. A switch control monitors each of the voltage outputs and drives the switching of the main switch and auxiliary switches to charge selective ones of the voltage outputs, which have fallen below their target voltages.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
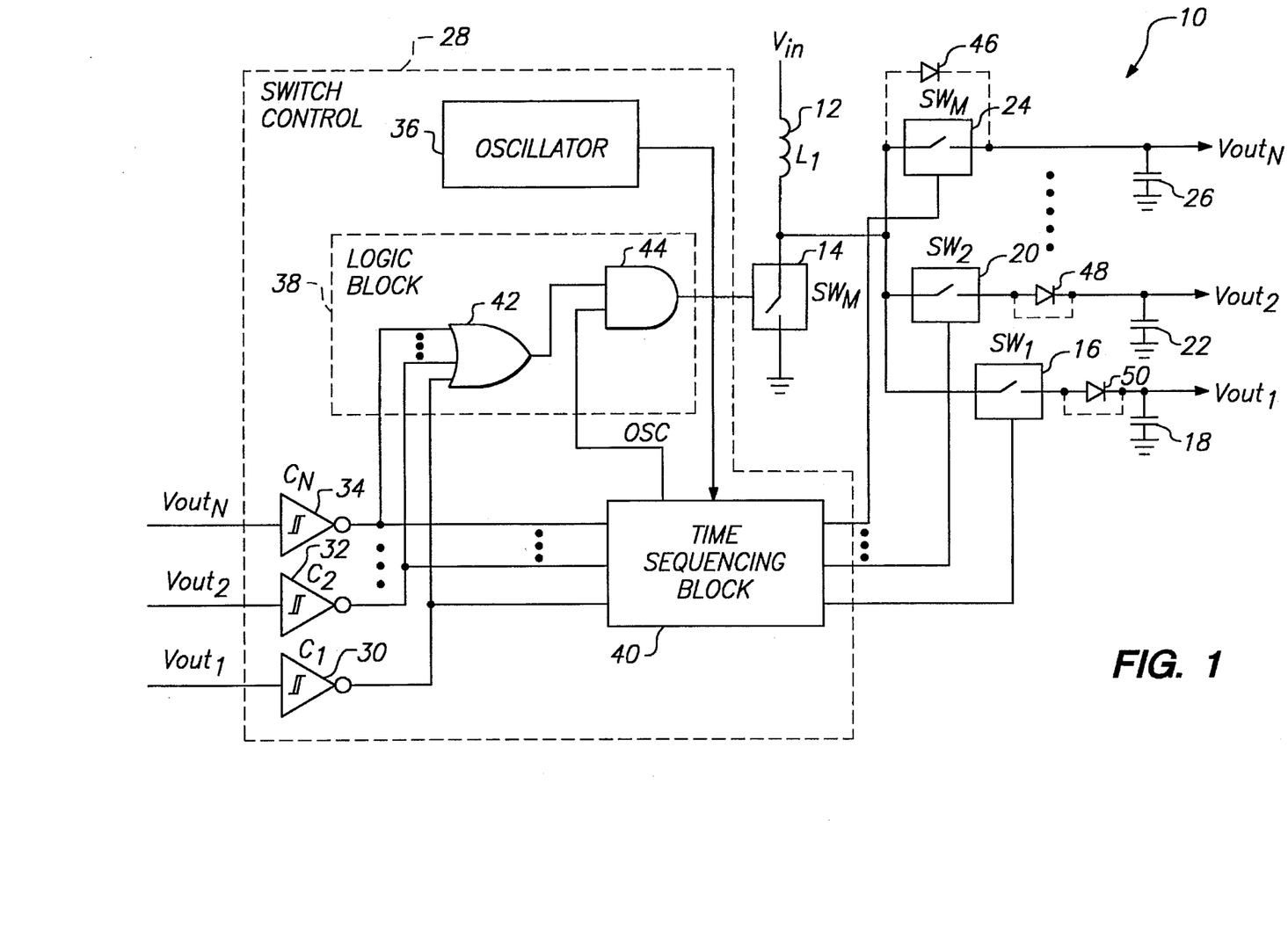
FIG. 1 is a block schematic diagram of an exemplary embodiment of the present invention showing a multiple output boost switching voltage regulator.

An example of a multiple output switching regulator implemented in accordance with the principles of the present invention is shown in FIG. 1. Switching regulator 10 includes inductor 12 ($L_1$), coupled between input $V_{IN}$ and ground (other predetermined reference potentials, such as $-V_{IN}$, may be used instead of ground). A main switch 14 ($SW_M$) is coupled in series with inductor 12 ($L_1$) between input $V_{IN}$ and ground. A first auxiliary switch 16 ($SW_1$) is coupled from a node between inductor 12 ($L_1$) and main switch 14 ($SW_M$) to a first voltage output $V_{OUT1}$. A first output capacitor 18 ($C_{OUT1}$) is coupled between voltage output $V_{OUT1}$ and ground. A second auxiliary switch 20 ($SW_2$) is coupled from the node between inductor 12 ($L_1$) and main switch 14 ($SW_M$) to a second voltage output $V_{OUT2}$. A second output capacitor 22 ($C_{OUT2}$) is coupled between voltage output $V_{OUT2}$ and ground.

Output capacitors 18 ($C_{OUT1}$) and 22 ($C_{OUT2}$) are not required to be connected to ground. Alternatively, for example, they may be stacked such that output capacitor 22 ($C_{OUT2}$) is coupled between voltage output $V_{OUT2}$ and $V_{OUT1}$.

The present invention may include more than two independently regulated voltage outputs. Accordingly, FIG. 1 shows a third auxiliary switch 24 ($SW_N$) coupled from the node between inductor 12 ($L_1$) and main switch 14 ($SW_M$) to a third voltage output $V_{OUTN}$. Output capacitor 26 ($C_{OUTN}$) is coupled between voltage output $V_{OUTN}$ and ground. As used herein, the letter N represents an integer greater than 2.

Control of main switch 14 ($SW_M$) and auxiliary switches 16 ($SW_1$), 20 ($SW_2$) and 24 ($SW_N$) is accomplished by switch control 28. Switch control 28 is coupled between voltage outputs $V_{OUT1}$, $V_{OUT2}$ and $V_{OUTN}$ and switches 14 ($SW_M$), 16 ($SW_1$), 20 ($SW_2$) and 24 ($SW_N$), and functions to drive the switching of the main switch and to sequence the switching of the auxiliary switches, when at least one of the voltage outputs has fallen below its target voltage.

As shown in FIG. 1, switch control 28 includes comparator 30 ($C_1$), comparator 32 ($C_2$), comparator 34 ($C_N$), oscillator 36, logic block 38 and time sequencing block 40. Referring now to the circuitry internal to switch control 28, the inputs of comparators 30 ($C_1$), 32 ($C_2$) and 34 ($C_N$) are coupled to corresponding voltage outputs $V_{OUT1}$, $V_{OUT2}$ and $V_{OUTN}$, for sensing the voltage outputs. Comparators 30 ($C_1$), 32 ($C_2$) and 34 ($C_M$) may be coupled to voltage outputs $V_{OUT1}$, $V_{OUT2}$ and $V_{OUTN}$, directly or through a resistor network for suitable scaling of the voltage outputs. The outputs of comparators 30 ($C_1$), 32 ($C_2$) and 34 ($C_N$) are connected to logic block 38 and time sequencing block 40. Logic block 38 includes OR gate 42 and AND gate 44, and functions to gate the oscillator signal from time sequencing block 40 so that main switch 14 ($SW_M$) is only switched when at least one of the voltage outputs is too low as indicated by the outputs of comparators 30 ($C_1$), 32 ($C_2$), and 34 ($C_N$). Logic block 38 may be implemented by logic configurations other than that illustrated in FIG. 1. Oscillator 36, which may be implemented using conventional oscillator circuitry, is connected to time sequencing block 40 and provides a constant ON time and constant OFF time for operation of the regulator circuitry. The inputs of time sequencing block 40 are coupled to oscillator 36 and comparators 30 ($C_1$), 32 ($C_2$) and 34 ($C_N$). The outputs of time sequencing block 40 are coupled to AND gate 44 and auxiliary switches 16 ($SW_1$), 20 ($SW_2$) and 24 ($SW_N$). The circuitry of time sequencing block 40 controls main switch 14 ($SW_M$) and auxiliary switches 16 ($SW_1$), 20 ($SW_2$) and 24 ($SW_N$) in accordance with the output signals of comparators 30 ($C_1$), 32 ($C_2$) and 34 ($C_N$) and the clocking signal from oscillator 36. Time sequencing block 40 may be implemented in various ways using a number of different logic configurations. Three exemplary embodiments of time sequencing block 40 are set forth below in the descriptions of FIG. 2B, FIG. 3B and FIG. 4B.

The circuit of FIG. 1 generally operates as follows. Switch control 28 controls the ON and OFF switching of main switch 14 ($SW_M$) and auxiliary switches 16 ($SW_1$), 20 ($SW_2$) and 24 ($SW_N$) in order to regulate the output voltages. Switch control 28 monitors the voltage outputs such that when any of voltage outputs $V_{OUT1}$, $V_{OUT2}$ and $V_{OUTN}$ decreases below its lower reference threshold, switch control 28 sends signals to turn ON (close) and OFF (open) main switch 14 ($SW_M$) and auxiliary switches 16 ($SW_1$), 20 ($SW_2$) and 24 ($SW_N$) as needed to restore voltage outputs $V_{OUT1}$, $V_{OUT2}$ and $V_{OUTN}$ to their target voltages.

When output capacitors 18 ($C_{OUT1}$), 22 ($C_{OUT2}$) and 26 ($C_{OUTN}$) are all charged to their target voltages, main switch 14 ($SW_M$) and auxiliary switches 16 ($SW_1$), 20 ($SW_2$) and 24 ($SW_N$) are all turned OFF (open) by switch control 28, and load current is supplied by output capacitors 18 ($C_{OUT1}$), 22 ($C_{OUT2}$) and 26 ($C_{OUTN}$). This causes voltage outputs $V_{OUT1}$, $V_{OUT2}$ and $V_{OUTN}$ to droop slowly while being continuously monitored by their respective comparators 30 ($C_1$), 32 ($C_2$) and 34 ($C_N$). If any of the voltage outputs $V_{OUT1}$, $V_{OUT2}$ or $V_{OUTN}$ decreases below the reference threshold of its corresponding comparator 30 ($C_1$), 32 ($C_2$) or 34 ($C_N$), the output of the corresponding comparator changes state, gating the oscillator output of time sequencing block 40 to main switch 14 ($SW_M$). This causes main switch 14 ($SW_M$) to start switching.

Every time main switch 14 ($SW_M$) turns ON (closes), a quantum of energy is stored in inductor 12 ($L_1$). When main switch 14 ($SW_M$) turns OFF (opens), one or more of auxiliary switches 16 ($SW_1$), 20 ($SW_2$) and 24 ($SW_N$) turns ON (closes), and the quantum of energy stored in inductor 12 ($L_1$) is transferred to the closed switch's corresponding output capacitor. For example, if voltage output $V_{OUT1}$ decreases below its lower reference threshold, when main switch 14 ($SW_M$) turns OFF (opens), auxiliary switch 16 ($SW_1$) turns ON (closes), allowing the stored energy from inductor 12 ($L_1$) to be transferred to output capacitor 18 ($C_{OUT1}$). This causes voltage output $V_{OUT1}$ to rise. Due to built-in hysteresis of comparator 30 (Cl) and/or total loop delay, main switch 14 ($SW_M$) and auxiliary switch 16 ($SW_1$) continue switching until output capacitor 18 ($C_{OUT1}$) charges above the upper reference threshold of comparator 30 ($C_1$). As used herein, "upper reference threshold" refers to the voltage at which a rising voltage level causes a comparator to change its output state. "Lower reference threshold" refers to the voltage at which a falling voltage level causes a comparator to change its output state. After several switching cycles, voltage output $V_{OUT1}$ rises above the upper reference threshold of comparator 30 ($C_1$), and the comparator turns off. If no other output capacitors require charging, all of the switching stops.

Time sequencing block 40 monitors the outputs of comparators 30 ($C_1$), 32 ($C_2$) and 34 ($C_N$) thus getting information on which of output capacitors 18 ($C_{OUT1}$), 22 ($C_{OUT2}$) and 26 ($C_{OUTN}$) requires charging. Time sequencing block 40 is synchronized with oscillator 36 to turn on any of auxiliary switches 16 ($SW_1$), 20 ($SW_2$) and 24 ($SW_N$) at the right moment. If more than one of voltage outputs $V_{OUT1}$, $V_{OUT2}$ and $V_{OUTN}$ discharges below its lower reference threshold at the same time, time sequencing block 40 provides a certain ON-OFF sequencing for auxiliary switches 16 ($SW_1$), 20 ($SW_2$) and 24 ($SW_N$) to transfer stored quantums of energy from inductor 12 ($L_1$) to output capacitors 18 ($C_{OUT1}$), 22 ($C_{OUT2}$) and 26 ($C_{OUTN}$), when main switch 14 ($SW_M$) is OFF (open).

Figure 2A:
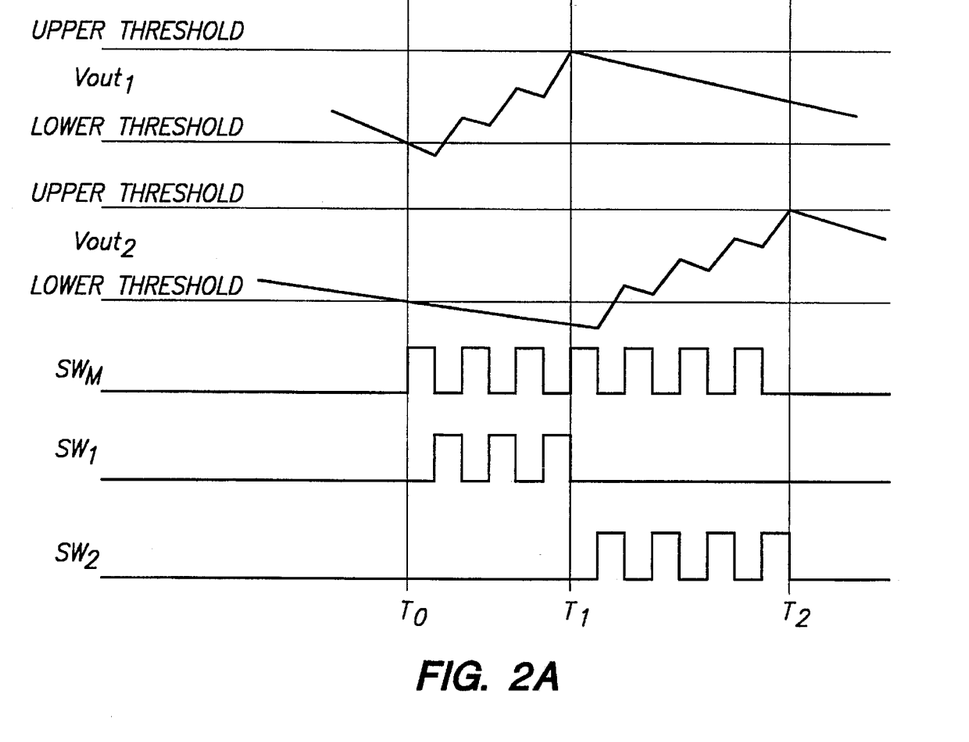
FIG. 2A is a timing diagram of an embodiment of the time sequencing provided by time sequencing block 40 of FIG. 1.
Figure 3A:
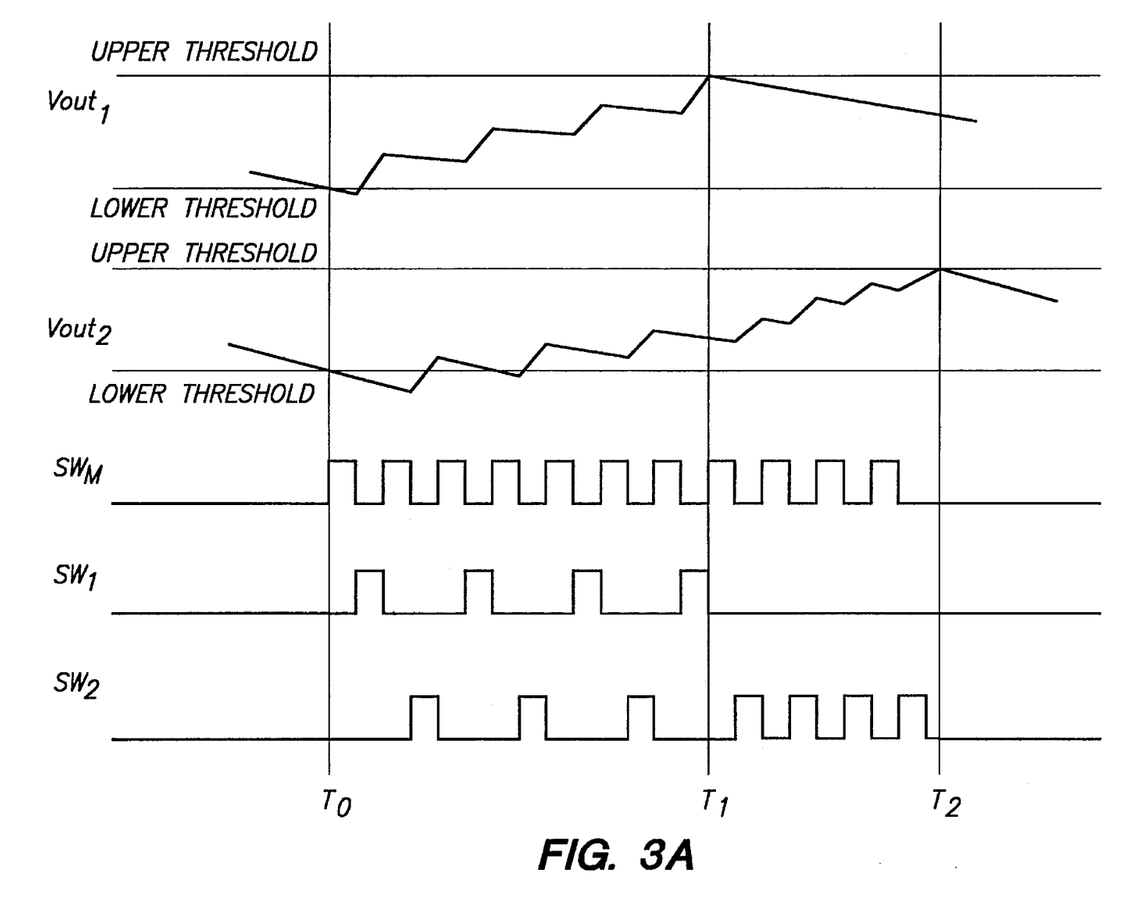
FIG. 3A is a timing diagram of an embodiment of the time sequencing provided by time sequencing block 40 of FIG. 1.
Figure 4A:
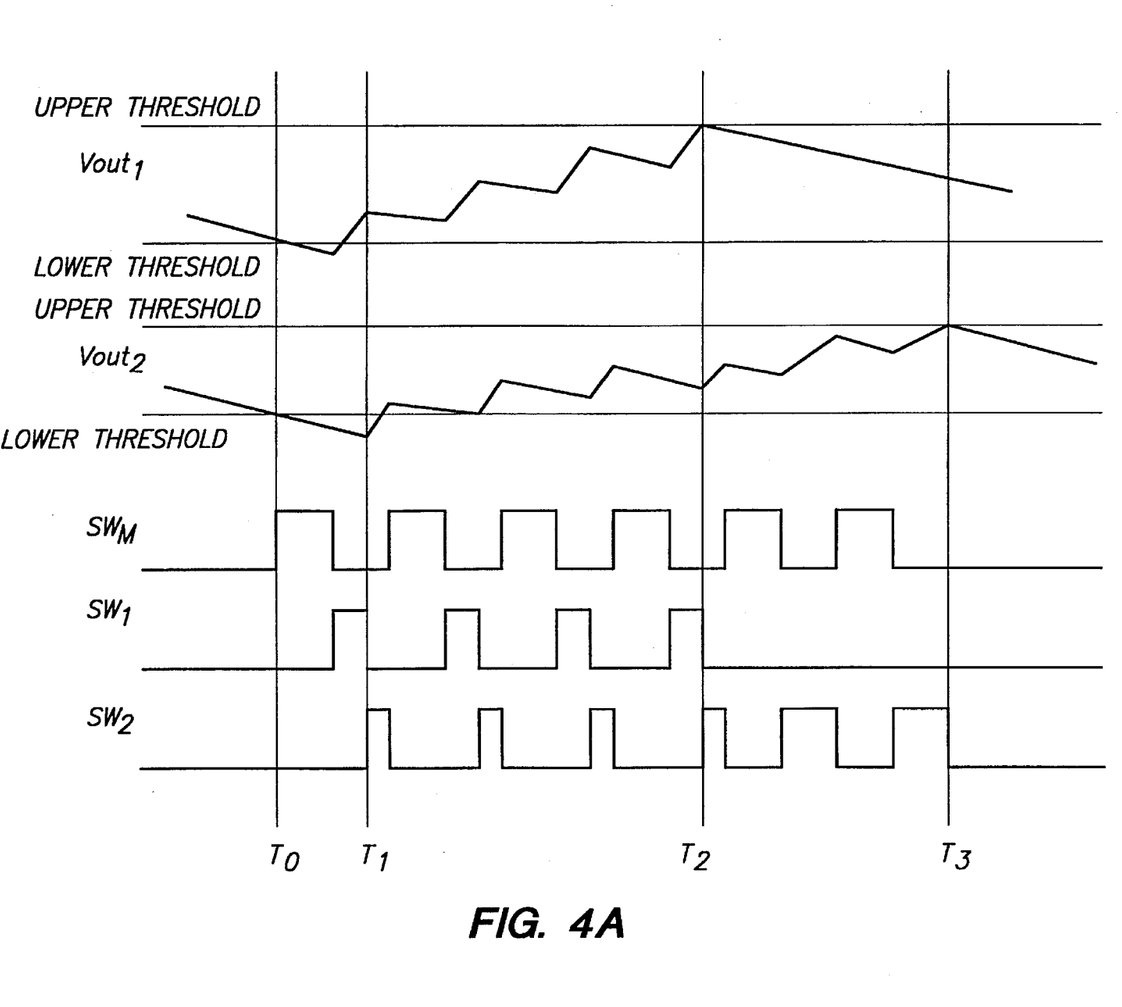
FIG. 4A is a timing diagram of an embodiment of the time sequencing provided by time sequencing block 40 of FIG. 1.

The timing diagrams in FIGS. 2A, 3A and 4A illustrate three ways to implement the sequencing of the switching of auxiliary switches 16 ($SW_1$), 20 ($SW_2$) and 24 ($SW_M$). In each of FIGS. 2A, 3A and 4A, voltage outputs $V_{OUT1}$ and $V_{OUT2}$ and the ON-OFF switching of main switch 14 ($SW_M$) and auxiliary switches 16 ($SW_1$) and 20 ($SW_2$) are shown over time. Although each of the timing diagrams in FIGS. 2A, 3A and 4A shows a two output application, it should be apparent that the same time sequencing techniques can be applied in accordance with the principles of the present invention to regulator circuits having more than two outputs.

Referring now to the timing diagram in FIG. 2A, energy can be delivered to one output capacitor until that output is completely charged to its upper threshold level. At time $T_0$, voltage outputs $V_{OUT1}$ and $V_{OUT2}$ have both discharged to their respective lower voltage thresholds. In response to the outputs of comparators 30 ($C_1$) and 32 ($C_2$), logic block 38 gates the oscillator output of time sequencing block 40 to main switch 14 ($SW_M$). This causes main switch 14 ($SW_M$) to start switching. Time sequencing block 40 starts switching auxiliary switch 16 ($SW_1$), while keeping auxiliary switch 20 ($SW_2$) OFF (open). For several switching cycles, auxiliary switch 16 ($SW_1$) turns ON (closes) when main switch 14 ($SW_M$) turns OFF (opens), and the energy stored in inductor 12 ($L_1$) is transferred to output capacitor 18 ($C_{OUT1}$). Voltage output $V_{OUT1}$ rises, while voltage output $V_{OUT2}$ continues discharging. At time $T_1$, voltage output $V_{OUT1}$ reaches its upper reference threshold, and time sequencing block 40 stops switching auxiliary switch 16 (SW$_1$), and starts switching auxiliary switch 20 (SW$_2$). Auxiliary switch 20 (SW$_2$) turns ON (closes) when main switch 14 (SW$_M$) turns OFF (opens), and the energy stored in inductor 12 (L$_1$) is now transferred to voltage output V$_{OUT2}$. At time T$_2$, after several more switching cycles, voltage output V$_{OUT2}$ reaches its upper reference threshold. Comparators 30 (C$_1$) and 32 (C$_2$) return to their original state, logic block 38 blocks the oscillator signal to main switch 14 (SW$_M$), and time sequencing block 40 stops switching auxiliary switch 20 (SW$_2$).

Figure 2B:
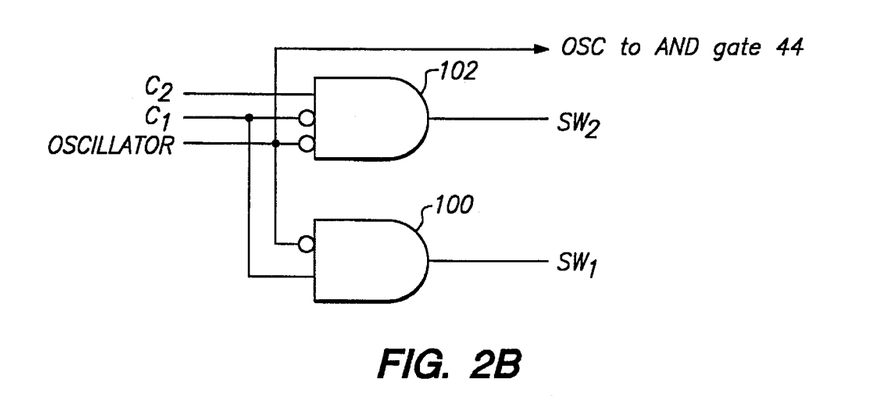
FIG. 2B is a block diagram of a first exemplary logic configuration for time sequencing block 40 of FIG. 1, which provides the time sequencing shown in FIG. 2A.

An example of a possible logic configuration for time sequencing block 40 of FIG. 1 that provides the time sequencing of FIG. 2A is shown in FIG. 2B. In this configuration, the switching frequency of main switch 14 (SW$_M$) is equal to the switching frequency of auxiliary switches 16 (SW$_1$) and 20 (SW$_2$). Referring now to FIG. 2B, the switching signals for auxiliary switches 16 (SW$_1$) and 20 (SW$_2$) are provided by AND gates 100 and 102. A signal from oscillator 36 controls the switching of main switch 14 (SW$_M$) and provides an inverted input to AND gates 100 and 102 so that the outputs of AND gates 100 and 102 are low when the oscillator signal is high. This causes auxiliary switches 16 (SW$_1$) and 20 (SW$_2$) to be OFF (open) when main switch 14 (SW$_M$) is ON (closed). Signals from comparators 30 (C$_1$) and 32 (C$_2$) are also provided to AND gates 100 and 102 so that the outputs of AND gate 100 and 102 are only enabled when the signal from the corresponding comparator is high and the oscillator signal is low. The output of comparator 32 (C$_2$) provides an input to AND gate 102. The output of comparator 30 (C$_1$) provides an input to AND gate 100 and is also inverted and provided to AND gate 102 so that the output of AND gate 102 is high only if comparator 30 (C$_1$) is low, indicating that voltage output V$_{OUT1}$ is within its desired voltage band.

Referring now to the timing diagram in FIG. 3A, energy can be delivered to each output on a pulse-by-pulse basis. At time T$_0$, voltage outputs V$_{OUT1}$ and V$_{OUT2}$ have both discharged to their respective lower voltage thresholds. In response to the outputs of comparators 30 (C$_1$) and 32 (C$_2$), logic block 38 gates the oscillator output of time sequencing block 40 to main switch 14 (SW$_M$), and main switch 14 (SW$_M$) starts switching. Time sequencing block 40 starts switching auxiliary switches 16 (SW$_1$) and 20 (SW$_2$) alternately at half the frequency of the main oscillator signal. Auxiliary switch 16 (SW$_1$) turns ON (closes) during the first OFF cycle of main switch 14 (SW$_M$), so that the energy stored in inductor 12 (L$_1$) is transferred to output capacitor 18 (C$_{OUT1}$), causing voltage output V$_{OUT1}$ to rise. During the second OFF cycle of main switch 14 (SW$_M$), auxiliary switch 20 (SW$_2$) turns ON (closes), so that the energy stored in inductor 12 (L$_1$) is transferred to output capacitor 22 (C$_{OUT2}$), causing output voltage V$_{OUT2}$ to rise. For several switching cycles, energy is transferred alternately to output capacitors 18 (C$_{OUT1}$) and 22 (C$_{OUT2}$), through corresponding auxiliary switches 16 (SW$_1$) and 20 (SW$_2$). At time T$_1$, voltage output V$_{OUT1}$ charges to its upper reference threshold, and time sequencing block 40 stops switching auxiliary switch 16 (SW$_1$). Main switch 14 (SW$_M$) and auxiliary switch 20 (SW$_2$) continue switching, now at equal frequency, until voltage output V$_{OUT2}$ reaches its upper reference threshold at time T$_2$. At this moment, all of the switching stops.

Figure 3B:
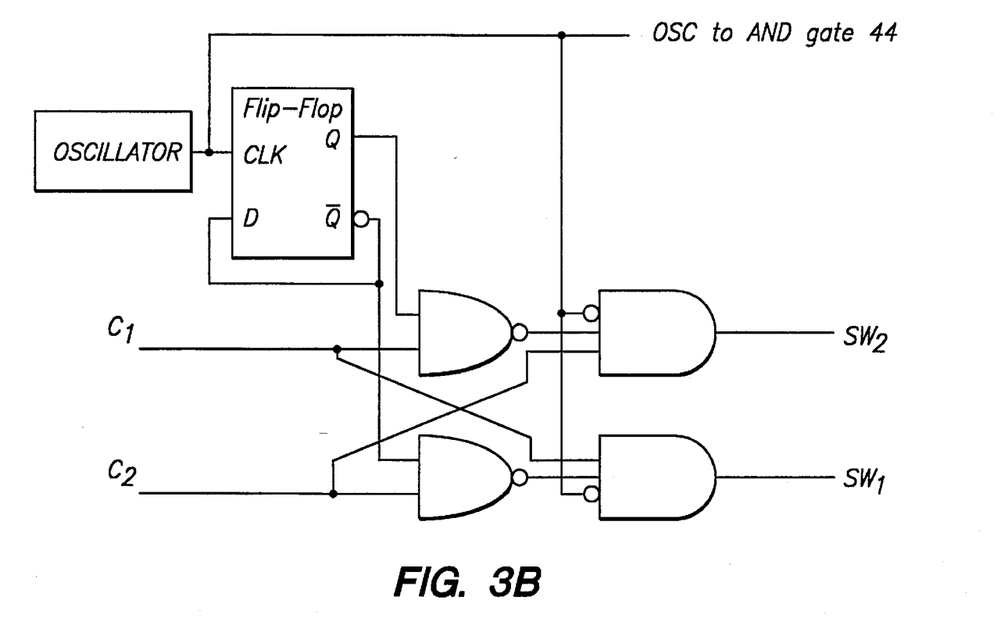
FIG. 3B is a block diagram of a second exemplary logic configuration for time sequencing block 40 of FIG. 1, which provides time sequencing shown in FIG. 3A.

An example of a possible logic configuration for time sequencing block 40 of FIG. 1 that provides the time sequencing of FIG. 3A is shown in FIG. 3B. In this configuration, a flip-flop divides the main switching frequency so that it exceeds the frequency of auxiliary switches 16 (SW$_1$) and 20 (SW$_2$).

Referring now to the timing diagram in FIG. 4A, energy can be delivered to each of the output capacitors within one cycle of the main switch. At time T$_0$, voltage outputs V$_{OUT1}$ and V$_{OUT2}$ have both discharged to their respective lower voltage thresholds. In response to the outputs of comparators 30 (C$_1$) and 32 (C$_2$), logic block 38 gates the oscillator output of time sequencing block 40 to main switch 14 (SW$_M$), and main switch 14 (SW$_M$) starts switching. Time sequencing block 40 starts switching auxiliary switches 16 (SW$_1$) and 18 (SW$_2$) alternately so that energy is transferred to each output within a single OFF cycle of main switch 14 (SW$_M$). When main switch 14 (SW$_M$) turns OFF (opens), auxiliary switch 16 (SW$_1$) turns ON (closes), and energy stored in inductor 12 (L$_1$) is transferred to output capacitor 18 (C$_{OUT1}$), causing voltage output V$_{OUT1}$ to rise. At time T$_1$, halfway into the OFF cycle of main switch 14 (SW$_M$), auxiliary switch 16 (SW$_1$) turns OFF (opens), and auxiliary switch 20 (SW$_2$) turns ON (closes). The energy still stored in inductor 12 (L$_1$) at time T$_1$ is transferred to output capacitor 22 (C$_{OUT2}$), causing voltage output V$_{OUT2}$ to rise. For several more switching cycles, during the OFF cycle of main switch 14 (SW$_M$), energy is transferred to output capacitors 18 (C$_{OUT1}$) and 22 (C$_{OUT2}$) through corresponding auxiliary switches 16 (SW$_1$) and 20 (SW$_2$). At time T$_2$, voltage output V$_{OUT1}$ is charged to its upper reference threshold, and time sequencing block 40 turns auxiliary switch 16 (SW$_1$) permanently OFF. Main switch 14 (SW$_M$) and auxiliary switch 20 (SW$_2$) continue their switching action until voltage output V$_{OUT2}$ reaches its upper reference threshold at time T$_3$. At this moment, all of the switching stops.

Figure 4B:
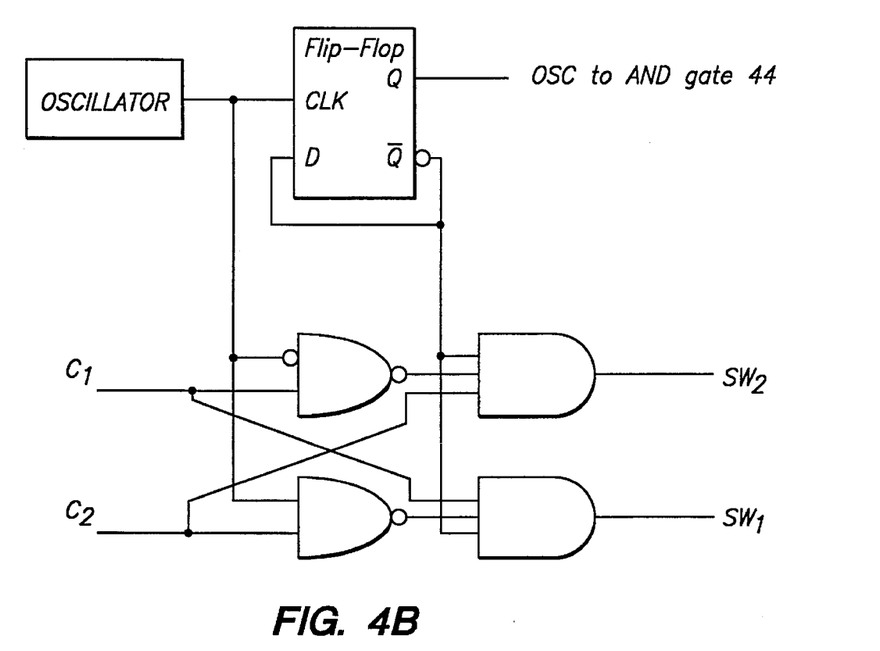
FIG. 4B is a block diagram of a third exemplary logic configuration for time sequencing block 40 of FIG. 1, which provides the time sequencing shown in FIG. 4B.

An example of a possible logic configuration for time sequencing block 40 of FIG. 1 that provides the time sequencing of FIG. 4A is shown in FIG. 4B. In this configuration, a flip-flop is provided so that the equivalent switching frequency of the auxiliary switches 16 (SW$_1$) and 20 (SW$_2$) exceeds the frequency of main switch 14 (SW$_M$).

Main switch 14 (SW$_M$) and auxiliary switches 16 (SW$_1$), 20 (SW$_2$) and 24 (SW$_N$) of the present invention may be NPN or PNP bipolar transistors, n-channel or p-channel power MOSFETS, or diodes. The time sequencing control schemes shown in FIGS. 2B, 3B and 4B contemplate the use of active switches such as bipolar transistors or MOSFETS. Controlled active switching guarantees that only one of the auxiliary switches turns ON (closes) at a given time. In an alternative embodiment, a diode may be substituted for the active auxiliary switch that is coupled to the highest voltage output. This is illustrated in FIG. 1 by the dotted lines around auxiliary switch 24 (SW$_N$). If voltage output V$_{OUT1}$ is the highest voltage output, diode 46 may be substituted for auxiliary switch 24 (SW$_N$), such that the anode of diode 46 is connected to main switch 14 (SW$_M$) and the cathode of diode 46 is connected to voltage output V$_{OUTN}$. When active auxiliary switches 16 (SW$_1$) and 20 (SW$_2$) are turned OFF (open), diode 46 automatically transfers energy to voltage output V$_{OUTN}$ during the main switch 14 (SW$_M$) OFF time. If either of the active auxiliary switches 16 (SW$_1$) or 20 (SW$_2$) corresponding to voltage outputs V$_{OUT1}$ or V$_{OUT2}$ is turned ON (closed), the voltage at the anode of diode 46 is lower than voltage output V$_{OUTN}$, and therefore diode 46 does not conduct. This alternative embodiment of the invention simplifies the time sequencing control schemes shown in FIGS. 2B, 3B and 4B because substituting diode 46 for an active auxiliary switch eliminates the need for time sequencing block 40 to generate a control signal for that switch.

The time sequencing control schemes shown in FIGS. 2B, 3B and 4B assume that no blocking diodes are used. However, in an alternative embodiment of the present invention, blocking diodes may be inserted in series with the auxiliary switches. As shown in FIG. 1, blocking diode 48 is coupled between auxiliary switch 20 (SW$_2$) and voltage output V$_{OUT2}$. Blocking diode 50 is coupled between auxiliary switch 16 (SW$_1$) and voltage output V$_{OUT1}$. Alternatively, blocking diode 48 may be coupled between the node between inductor 12 (L$_1$) and main switch 14 (SW$_M$), and auxiliary switch 20 (SW$_2$). Likewise, blocking diode 50 may be coupled between the node between inductor 12 (L$_1$) and main switch 14 (SW$_M$), and auxiliary switch 16 (SW$_1$). Assuming that voltage output V$_{OUT1}$ is the lowest voltage output, when both of auxiliary switches 16 (SW$_1$) and 20 (SW$_2$) are ON (closed), blocking diode 50 allows voltage output V$_{OUT1}$ to be charged during the main switch 14 (SW$_M$) OFF time. The voltage at the anode of blocking diode 48 is lower than voltage output V$_{OUT2}$ and therefore prevents the charging of voltage output V$_{OUT2}$. This eliminates the need for time sequencing block 40 to generate a control signal for auxiliary switch 16 (SW$_1$). Thus, use of this alternative embodiment also may simplify the time sequencing control schemes of the present invention.

Figure 5A:
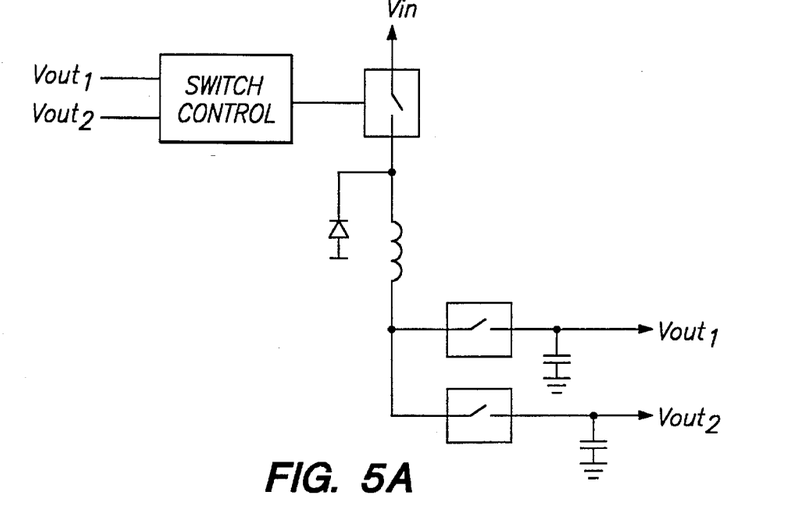
FIG. 5A is a block schematic diagram of another exemplary embodiment of the present invention showing a multiple output buck switching voltage regulator.
Figure 5B:
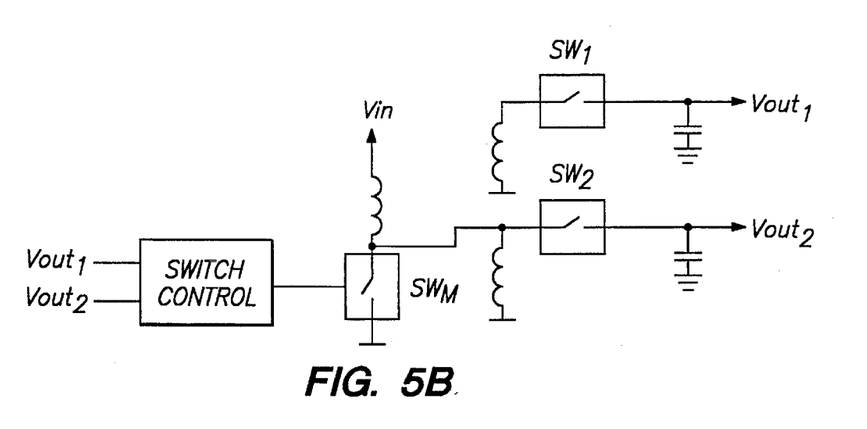
FIG. 5B is a block schematic diagram of a further exemplary embodiment of the present invention showing a multiple output flyback switching voltage regulator.
Figure 5C:
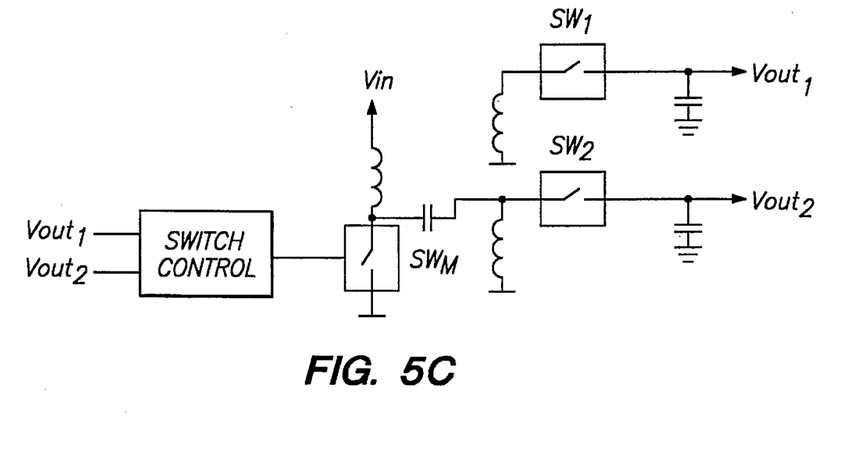
FIG. 5C is a block schematic diagram of yet another exemplary embodiment of the present invention showing a multiple output SEPIC switching voltage regulator.

The principles of the present invention may be used with various switching regulator configurations or "topologies". The circuit shown FIG. 1 has a boost topology. Boost switching regulators provide output voltages that are greater than their input voltage. FIG. 5A shows an example of an implementation of an embodiment of the present invention in a buck topology. Buck switching regulators provide output voltages that are less than their input voltage. FIG. 5B shows an implementation of an embodiment of the present invention in a flyback topology. FIG. 5C shows an implementation of an embodiment of the present invention in SEPIC topology. Each of the circuits in FIGS. 5A, 5B and 5C can be implemented and operated in accordance with the time sequencing techniques of the present invention previously discussed herein. It is also possible to use the principles of the present invention to combine different topologies together in one circuit. For example, a boost-flyback regulator can be constructed. In that configuration, one output is obtained in boost fashion, and the other output comes from flyback energy in an overwinding. An inverting (positive-to-negative) regulator can also be constructed using the principles of the present invention. Each of the switching regulator circuits referred to herein may be implemented and operated as an integrated circuit in accordance with the principles of the present invention.

Although preferred embodiments of the inventions have been disclosed, with various components connected to other components, persons skilled in the art will appreciate that it may not be necessary for such connections to be direct and additional components may be interconnected between the shown connected components without departing from the spirit of the invention as shown. Persons skilled in the art will appreciate also that the present invention can be practiced by other than the described embodiments. The described embodiments are presented for purposes of illustrations and not of limitation, and the present invention is limited only by the claims which follow.

What is claimed is:

1. A circuit for providing a plurality of independently regulated output voltages, said circuit comprising:

a main switch and an inductive element coupled in series with a source of electric potential;

a first auxiliary switch coupled at a first end to a node between said main switch and said inductive element, and coupled at a second end to produce a first output;

a second auxiliary switch coupled at a first end to a node between said main switch and said inductive element, and coupled at a second end to produce a second output; and a switch control coupled to drive the ON and OFF switching of said main switch and said first and second auxiliary switches, said switch control gating the switching of said main switch only when one or more of said outputs falls below its predetermined threshold, and said switch control generating control signals for said auxiliary switches to charge one or more of said outputs in a predetermined sequence.

2. The circuit of claim 1, wherein said main switch and said first and second auxiliary switches are bipolar transistors.

3. The circuit of claim 1, wherein said main switch and said first and second auxiliary switches are MOSFETS.

4. The circuit of claim 1, wherein at least one of said first and second auxiliary switches is a diode.

5. The circuit of claim 1, further comprising:

a first diode in series with said first auxiliary switch; and a second diode in series with said second auxiliary switch.

6. The circuit of claim 1, wherein said source of electrical potential is between a positive supply voltage and ground.

7. The circuit of claim 1, wherein said source of electrical potential is between a positive supply voltage and a negative supply voltage.

8. The circuit of claim 1, wherein said source of electrical potential is between ground and a negative supply voltage.

9. The circuit of claim 1, wherein said source of electrical potential is between two different supply voltages of like polarity.

10. The circuit of claim 1, wherein said first output is produced at a first output terminal, said second output is produced at a second output terminal and said source of electrical potential is across first and second input terminals.

11. The circuit of claim 10 further comprising:

a first output capacitor coupled to said first output terminal; and a second output capacitor coupled to said second output terminal.

12. The circuit of claim 11, wherein said second output capacitor is coupled between said first and second output terminals.

13. The circuit of claim 1, wherein said switch control further includes:

a first comparator coupled to monitor the magnitude of said first output;

a second comparator coupled to monitor the magnitude of said second output; and time sequencing logic coupled to said first and second comparators for driving said main switch and one or more of said auxiliary switches, when one or more of said outputs falls below its predetermined threshold.

14. The circuit of claim 1, wherein said switch control includes time sequencing logic that controls the ON-OFF switching of said first and second auxiliary switches such that said first output is charged completely to its predetermined threshold, and then said second output is charged completely to its predetermined threshold.

15. The circuit of claim 1, wherein said switch control includes time sequencing logic that controls the ON-OFF switching of said first and second auxiliary switches such that said first and second outputs are charged alternately on a pulse-by-pulse basis.

16. The circuit of claim 1, wherein said switch control includes time sequencing logic that controls the ON-OFF switching of said first and second auxiliary switches such that said first and second outputs are charged within a single cycle of said main switch.

17. The circuit of claim 1, wherein said switch control includes time sequencing logic that controls the ON-OFF switching of said first and second auxiliary switches, such that said first auxiliary switch is ON during each consecutive OFF cycle of said main switch until said first output charges to its predetermined threshold.

18. The circuit of claim 1, wherein said switch control includes time sequencing logic that controls the ON-OFF switching of said first and second auxiliary switches, such that said first auxiliary switch is ON and said second auxiliary switch is OFF during a first OFF cycle of said main switch, and said first auxiliary switch is OFF and said second auxiliary switch is ON during a second OFF cycle of said main switch.

19. The circuit of claim 1, wherein said switch control includes time sequencing logic that controls the ON-OFF switching of said main switch and said first and second auxiliary switches, such that said first auxiliary switch is ON and said second auxiliary switch is OFF during a first portion of an OFF cycle of said main switch, and said first auxiliary switch is OFF and said second auxiliary switch is ON during a second portion of an OFF cycle of said main switch.

20. A circuit for providing a plurality of independently regulated output voltages, said circuit comprising:

a main switch and an inductive element coupled in series with a source of electric potential;

at least two auxiliary switches, each coupled at a first end to a node between said main switch and said inductive element, and each coupled at a second end to produce at least two corresponding outputs; and a switch control coupled to control the ON and OFF switching of said main switch and said auxiliary switches, said switch control driving the switching of said main switch when one or more of said outputs falls below its predetermined threshold, and said switch control including time sequencing logic which generates control signals for said auxiliary switches in response to one or more of said outputs being below its predetermined threshold, to charge one or more of said outputs in a predetermined sequence.

21. In a circuit adapted to be coupled to first and second terminals providing a source of electrical potential, a method for producing independently regulated first and second outputs comprising the steps of:

forming a current path between said first terminal and said second terminal through an inductive element and a main switch;

forming a current path between said first terminal and said first output through said inductive element and a first auxiliary switch;

forming a current path between said first terminal and said second output through said inductive element and a second auxiliary switch; and controlling the ON and OFF switching of said main switch and said first and second auxiliary switches such that when one or more of said outputs falls below its predetermined threshold, said main switch and said auxiliary switches switch in a predetermined sequence to charge one or more of said outputs, and said auxiliary switches switch out of phase with said main switch.

* * * * *